(12) United States Patent
Zhang et al.

(10) Patent No.: US 10,044,600 B2
(45) Date of Patent: Aug. 7, 2018

(54) METHOD AND DEVICE FOR CALCULATING A NETWORK PATH

(71) Applicant: ZTE Corporation, Shenzhen (CN)

(72) Inventors: Junhui Zhang, Shenzhen (CN); Yanjie Zhao, Shenzhen (CN); Zhui Guo, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 56 days.

(21) Appl. No.: 15/102,737

(22) PCT Filed: Jun. 16, 2014

(86) PCT No.: PCT/CN2014/080000
§ 371 (c)(1),
(2) Date: Jun. 8, 2016

(87) PCT Pub. No.: WO2015/085740
PCT Pub. Date: Jun. 18, 2015

(65) Prior Publication Data
US 2016/0315847 A1   Oct. 27, 2016

(30) Foreign Application Priority Data

Dec. 9, 2013   (CN) .......................... 2013 1 0662272

(51) Int. Cl.
*H04L 12/733* (2013.01)
*H04L 12/64* (2006.01)
(Continued)

(52) U.S. Cl.
CPC ........ *H04L 45/122* (2013.01); *H04L 12/6418* (2013.01); *H04L 41/0806* (2013.01);
(Continued)

(58) Field of Classification Search
CPC ... H04L 45/122; H04L 45/56; H04L 41/0806; H04L 12/6418; H04L 45/50; H04L 45/34; H04L 45/124; H04L 45/24; H04L 45/12
See application file for complete search history.

(56) References Cited

U.S. PATENT DOCUMENTS 8,976,797 B2 *  3/2015  Kotrla ................. H04L 12/4633
                                              370/395.42
9,369,387 B2 *  6/2016  Filsfils ................. H04L 47/122
(Continued)

FOREIGN PATENT DOCUMENTS

CN    101820556 A    9/2010
CN    103346971 A   10/2013
(Continued)

OTHER PUBLICATIONS

International Search Report for corresponding application PCT/CN2014/080000 filed on Jun. 16, 2014; dated Sep. 29, 2014.
(Continued)

*Primary Examiner* — Brian O'Connor
(74) *Attorney, Agent, or Firm* — Cantor Colburn

(57) ABSTRACT

The present disclosure discloses a method and device for calculating a network path. Wherein, the method includes that: a network control node calculates a forwarding path from a source node to a destination node according to capability information of a forwarding node and a constraint condition. By the method, correctness of calculating the SDN path and network applicability may be improved.

16 Claims, 3 Drawing Sheets

(51) Int. Cl.
  *H04L 12/24* (2006.01)
  *H04L 12/771* (2013.01)
  *H04L 12/721* (2013.01)
  *H04L 12/707* (2013.01)
  *H04L 12/723* (2013.01)

(52) U.S. Cl.
  CPC ............ *H04L 45/56* (2013.01); *H04L 45/12* (2013.01); *H04L 45/124* (2013.01); *H04L 45/24* (2013.01); *H04L 45/34* (2013.01); *H04L 45/50* (2013.01)

(56) References Cited

U.S. PATENT DOCUMENTS

| | | | | |
|---|---|---|---|---|
| 9,577,925 | B1* | 2/2017 | Bahadur | H04L 45/50 |
| 9,647,944 | B2* | 5/2017 | Filsfils | H04L 47/122 |
| 2011/0205901 | A1 | 8/2011 | Imai | |
| 2013/0070604 | A1 | 3/2013 | Lu | |
| 2013/0188493 | A1 | 7/2013 | Numata | |
| 2015/0117203 | A1* | 4/2015 | Filsfils | H04L 47/122 |
| | | | | 370/235 |
| 2015/0172171 | A1* | 6/2015 | Beller | H04L 45/128 |
| | | | | 398/45 |
| 2016/0142278 | A1* | 5/2016 | Pignataro | H04L 43/10 |
| | | | | 370/241.1 |

FOREIGN PATENT DOCUMENTS

| | | |
|---|---|---|
| CN | 103348635 A | 10/2013 |
| EP | 2819356 A1 | 12/2014 |

OTHER PUBLICATIONS

"SPARC ICT-258457 Split Architecture for Large Scale Wide Area Networks. Deliverable D3.3", Dec. 1, 2011, XP055139597, Retrieved from the Internet: URL:http://www.fp7-sparc.eu/assets/deliverables/SPARC_D3.3_Split_Archtecture_for_Large_Scale_Wide_Area_Networks.pdf [Retrieved on Sep. 11, 201].

Kwangtae, Jeong, et al.: "QoS-aware Network Operating System for software defined networking with Genralized OpenFlows", 2012 IEEE Network Operations and Management Symposium, Apr. 1, 2012. pp. 1167-1174, XP055054272.

Supplementary European Search Report for corresponding application EP14869376; dated Oct. 26, 2016; pp. 9.

* cited by examiner

METHOD AND DEVICE FOR CALCULATING A NETWORK PATH

TECHNICAL FIELD

The present disclosure relates to the field of communication, and in particular to a method and device for calculating a network path.

BACKGROUND

With exposure of more and more disadvantages of an existing network and increasing requirements of people on network performance, researchers have to add many complex functions to structure system of a router, such as Open Shortest Path First (OSPF), a Border Gateway Protocol (BGP), multicast, service differentiation, traffic engineering, Network Address Translation (NAT), a firewall, Multi-Protocol Label Switching (MPLS) and so on. This made switching equipment such as a router more and more bloated and a space for performance improvement more and narrower.

However, entirely different from the dilemma in the field of networks, the field of computers is developed rapidly. In careful review of the field of computers, it is easily found that the key is a simple and available hardware bottom layer (x86 instruction set) found in the field of computers. With such a common hardware bottom layer, both application programs and operating systems are rapidly developed in terms of software. Nowadays, many persons advocating to redesign a system structure of a computer network believe that: the success in the field of computers may be copied in the network to solve all problems encountered by the network at present. Under the guidance of such a concept, a future network will be constructed as follows: a bottom-layer data path (switch and router) is "dumb, simple and minimum", an open common Application Program Interface (API) about a flow table is defined, and meanwhile, a controller is adopted to control the whole network. Researchers may freely call the bottom-layer API for programming on the controller, thereby implementing network innovation in the future.

Based on the above concept, a Software Defined Network (SDN) emerges, and it is initially a novel network innovation architecture disclosed by research group clean slate of Standford University. At present, its core technology is OpenFlow protocol which separates a control plane (including OpenFlow Controller) and data plane (including OpenFlow Capable Switch) of network equipment, thereby implementing flexible control over network traffic and providing a good platform for innovations on the core network and applications.

The OpenFlow protocol is configured to describe a standard of information used for interaction between a controller (control unit) and a switch (forwarding unit) and an interface standard of the controller and the switch. A core part of the protocol is a set configured for an OpenFlow protocol information structure. After an OpenFlow Switch (OFS) and a controller establish a Transmission Control Protocol (TCP) connection and successfully shake hands, the controller sends a request message to obtain capabilities of the OFS (also called a data path), wherein the capabilities of the OFS including:

(1) switch features: a supported maximum buffer, a supported number of tables, a statistical capability (including a flow statistical capability, a table statistical capability, a port statistical capability, a group statistical capability and a queue statistical capability), a capability of Internet Protocol (IP) fragmentation and reassembly and a capability of avoiding a loop;

(2) flow table features: a maximum number of entries of a flow table, a supported and matched domain and mask (including: ports, metadata, message fields (Destination Media Access Control (DMAC), Source Media Access Control (SMAC), Ether Type, Virtual Local Area Network Identifier (VLAN ID), VLAN priority, IP Differentiated Services Code Point (DSCP), IP Explicit Congestion Notification (ECN), IP PROTO, Session Initiation Protocol (SIP), Double In-line Package (DIP), Transmission Control Protocol (TCP)/User Datagram Protocol (UDP) source port number and destination port number, Internet Control Message Protocol (ICMP) type, ICMP code, Address Resolution Protocol (ARP) opcode, ARP source Internet Protocol version 4 (IPv4) address, ARP target IPv4 address, ARP source hardware address, ARP target hardware address, Internet Protocol version 6 (IPv6) source address, IPv6 destination address, IPv6 Flow Label, ICMPv6 type, ICMPv6 code, Target address for ND, Source link-layer for ND, Target link-layer for ND, MPLS label, MPLS TC, MPLS BoS bit, Provider Backbone Bridge (PBB) I-SID, Logical Port Metadata, IPv6 Extension Header pseudo-field, PBB UCA header field and the like)), metadata allowed to be matched, metadata allowed to be written, supported instructions (instruction list, including: Meter, Apply-Actions, Clear-Actions, Write-Actions, Write-Metadata, Goto-Table and the like), supported actions (action list, including: Output, Set-Queue, Drop, Group, Push-Tag, Pop-Tag, Set-Field, Change-TTL and the like), and a table-miss capability;

(3) group features: a supported number of entries of a group, actions supported by a group (actions including: Output, Set-Queue, Drop, Group, Push-Tag, Pop-Tag, Set-Field, Change-TTL and the like), supported types of a group (including: OFPGT_ALL, OFPGT_SELECT, OFPGT_INDIRECT and OFPGT_FF), a group capability (OFPGFC_SELECT_WEIGHT, OFPGFC_SELECT_LIVENESS, OFPGFC_CHAINING and OFPGFC_CHAINING_CHECKS) and the like; and (4) meter features: the number of a meter table, supported types of bandwidth (including message discarding, DSCP remark and the like), max_color and the like.

FIG. 1 is a diagram of path calculation result and flow table configuration according to a related art. Referring to FIG. 1, in a process of calculating a path result and configuring a flow table shown in FIG. 1, a method for calculating a path of an SDN mainly considers external constraint conditions such as link cost (such as the number of hops), a link bandwidth and a link attribute; and after calculating a forwarding path according to an existing path algorithm, an SDN controller transmits a flow table to each OFS on the forwarding path according to a certain strategy. However, the switches (i.e., the above OFS) have different capabilities and the switches may not support a forwarding requirement of the controller, so that the flow table is failed to be configured to cause a message forwarding failure, and even though the switches report flow table configuration error messages to the controller, the controller cannot calculate a new path.

For the problem that a controller cannot calculate a new path due to the fact of flow table configuration failure caused by different capabilities of each switch in the related art, there is yet no effective solution.

SUMMARY

The present disclosure provides a method and device for calculating a network path, so as to at least solve the problem that a controller cannot calculate a new path due to the fact of flow table configuration failure caused by different capabilities of each switch in the related art.

According to one aspect of the present disclosure, a method for calculating a network path is provided, comprising: calculating, by a network control node, a forwarding path from a source node to a destination node according to capability information of a forwarding node and a constraint condition.

In an example embodiment, the method is applicable to a Software Defined Network (SDN), the network control node comprises: an SDN controller, and the forwarding node comprises: an OpenFlow Switch (OFS).

In an example embodiment, the capability information comprises: capability information of the OFS, wherein the capability information of the OFS comprises at least one of: a switch feature, a flow table feature, a group feature and a meter table feature.

In an example embodiment, the switch feature comprises at least one of: a supported maximum buffer, a supported number of a table, a statistical capability, a capability of Internet Protocol, IP fragmentation and reassembly and a capability of avoiding a loop; the flow table feature comprises at least one of: a maximum number of entries of a flow table, a supported and matched domain and mask, metadata allowed to be matched, metadata allowed to be written, supported instructions, supported actions and a table-miss capability; the group feature comprises at least one of: a supported number of entries of a group, actions supported by a group, a supported type of a group and a group capability; and the meter table feature comprises at least one of: the number of a meter table, a supported bandwidth type and a supported max_color.

In an example embodiment, the constraint condition comprises: link cost, wherein the link cost comprises: the number of hops; or, the constraint condition comprises: link cost and at least one of: a link bandwidth, a link attribute, a management weight and network resource information, wherein the link attribute comprises: a link priority.

In an example embodiment, a Shortest Path First/Constrained Shortest Path First (SPF/CSPF) path selection algorithm is adopted when the SDN controller calculates the forwarding path.

According to another aspect of the present disclosure, a device for calculating a network path is provided, located at a network control node and comprising: a calculating component, configured to calculate a forwarding path from a source node to a destination node according to capability information of a forwarding node and a constraint condition.

In an example embodiment, the device is applicable to a Software Defined Network (SDN), the network control node comprises: an SDN controller, and the forwarding node comprises: an OpenFlow Switch (OFS).

In an example embodiment, the capability information comprises: capability information of the OFS, wherein the capability information of the OFS comprises at least one of: a switch feature, a flow table feature, a group feature and a meter table feature.

In an example embodiment, the switch feature comprises at least one of: a supported maximum buffer, a supported number of a table, a statistical capability, a capability of Internet Protocol, IP, fragmentation and reassembly and a capability of avoiding a loop; the flow table feature comprises at least one of: a maximum number of entries of a flow table, a supported and matched domain and mask, metadata allowed to be matched, metadata allowed to be written, supported instructions, supported actions and a table-miss capability; the group feature comprises at least one of: a supported number of entries of a group, actions supported by a group, a supported type of a group and a group capability; and the meter table feature comprises at least one of: the number of a meter table, a supported bandwidth type and a supported max_color.

In an example embodiment, the constraint condition comprises: link cost, wherein the link cost comprises: the number of hops; or, the constraint condition comprises: link cost and at least one of: a link bandwidth, a link attribute, a management weight and network resource information, wherein the link attribute comprises: a link priority.

In an example embodiment, a Shortest Path First/Constrained Shortest Path First (SPF/CSPF) path selection algorithm is adopted when the calculating component calculates the forwarding path.

According to the present disclosure, a manner that the network control node adopts the capability information of the forwarding node as a constraint condition for calculating a network path on the basis of an existing constraint condition is adopted, so that the problem that the controller cannot calculate a new path due to the fact of flow table configuration failure caused by different capabilities of each switch in the related art is solved, and the effect of improving correctness on calculating a SDN path and improving a network applicability is further achieved.

BRIEF DESCRIPTION OF THE DRAWINGS

The drawings described here are adopted to provide further understanding of the present disclosure, and form a part of the present disclosure. Schematic embodiments of the present disclosure and description thereof are adopted to explain the present disclosure and not intended to form improper limits to the present disclosure. In the drawings.

DETAILED DESCRIPTION OF THE EMBODIMENTS

The present disclosure will be described below with reference to the drawings and embodiments in detail. It is important to note that the embodiments in the present disclosure and characteristics in the embodiments may be combined under the condition of no conflicts.

In order to solve the technical problem, a main idea of the technical solution provided by the present disclosure is that: capability information of a switch is adopted as a constraint condition to be combined with part or all of current constraint conditions for calculating a path. In such a path calculation manner, path calculation correctness and applicability of a network (such as an SDN, the network is certainly not limited to the SDN during a practical application, and the manner may also be adopted for network path calculation of other networks) may be improved.

Figure 1:
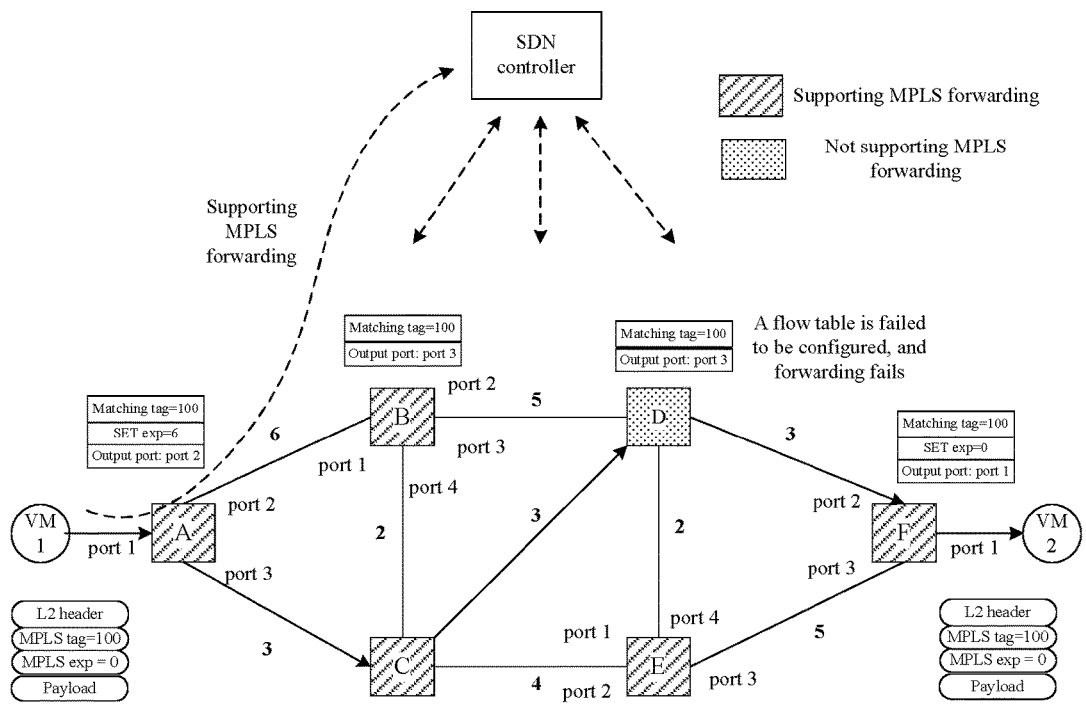
FIG. 1 is a diagram of path calculation result and flow table configuration according to the related art.
Figure 2:
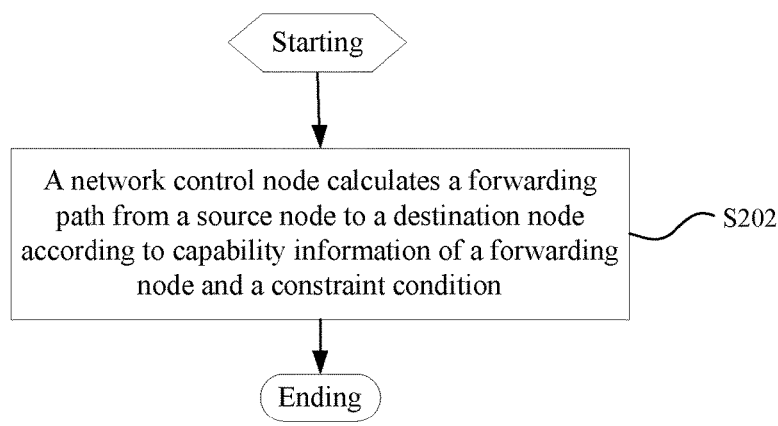
FIG. 2 is a flowchart of a method for calculating a network path according to an embodiment of the present disclosure.

A method for calculating a network path is provided in the embodiment. FIG. 2 is a flowchart of a method for calculating a network path according to an embodiment of the present disclosure, and as shown in FIG. 2, the method mainly includes the following step (Step 202):

Step 202: a network control node calculates a forwarding path from a source node to a destination node according to capability information of a forwarding node and a constraint condition.

By the step, the network control node adopts the capability information of the forwarding node as the consideration factor (constraint condition) for calculating the network path on the basis of the existing constraint condition, and in such a manner, path calculation correctness and network applicability may be improved.

In the embodiment, the method may be applicable to an SDN, the network control node includes: an SDN controller, and the forwarding node includes: an OFS. Of course, the method is not limited to the SDN during practical application, and the method may also be adopted for calculating network paths of other networks.

In the embodiment, the capability information may include: capability information of the OFS, wherein the capability information of the OFS includes at least one of: a switch feature, a flow table feature, a group feature and a meter table feature. Wherein, in an example implementation mode of the embodiment, the switch feature may include at least one of: a supported maximum buffer, a supported number of a table, a statistical capability, a capability of IP fragmentation and reassembly and a capability of avoiding a loop; the flow table feature may include at least one of: a maximum number of entries of a flow table, a supported and matched domain and mask, metadata allowed to be matched, metadata allowed to be written, supported instructions, supported actions and a table-miss capability; the group feature may include at least one of: a supported number of entries of a group, actions supported by a group, a supported type of a group and a group capability; and the meter table feature may include at least one of: the number of a meter table, a supported bandwidth type and a supported max_color.

In the embodiment, the constraint condition may include: link cost, wherein the link cost may include: the number of hops; or, the constraint condition may include: link cost and at least one of: a link bandwidth, a link attribute, a management weight and network resource information, wherein the link attribute may include: a link priority.

In the embodiment, an SPF/CSPF path selection algorithm may be adopted when the SDN controller calculates the forwarding path.

Figure 3:
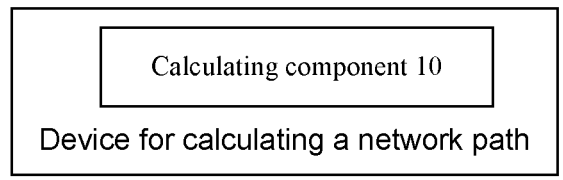
FIG. 3 is a structure block diagram of a device for calculating a network path according to an embodiment of the present disclosure.

The embodiment provides a device for calculating a network path, which is configured to implement the above-mentioned method for calculating the network path. FIG. 3 is a structure block diagram of a device for calculating a network path according to an embodiment of the present disclosure, and as shown in FIG. 3, the device mainly includes: a calculating component 10, configured to calculate a forwarding path from a source node to a destination node according to capability information of a forwarding node and a constraint condition.

In the embodiment, the device may be applicable to an SDN, a network control node includes: an SDN controller, and the forwarding node includes: an OFS. Of course, the device is not limited to the SDN during practical application, and the device may also be adopted for calculating network paths of other networks.

In the embodiment, the capability information may include: capability information of the OFS, wherein the capability information of the OFS may include at least one of: a switch feature, a flow table feature, a group feature and a meter table feature. Wherein, in an example implementation mode of the embodiment, the switch feature may include at least one of: a supported maximum buffer, a supported number of a table, a statistical capability, a capability of IP fragmentation and reassembly and a capability of avoiding a loop; the flow table feature may include at least one of: a maximum number of entries of a flow table, a supported and matched domain and mask, metadata allowed to be matched, metadata allowed to be written, supported instructions, supported actions and a table-miss capability; the group feature may include at least one of: a supported number of entries of a group, actions supported by a group, a supported type of a group and a group capability; and the meter table feature may include at least one of: the number of a meter table, a supported bandwidth type and a supported max_color.

In the embodiment, the constraint condition may include: link cost, wherein the link cost may include: the number of hops; or, the constraint condition may include: link cost and at least one of: a link bandwidth, a link attribute, a management weight and network resource information, wherein the link attribute may include: a link priority.

In the embodiment, an SPF/CSPF path selection algorithm may be adopted when the calculating component calculates the forwarding path.

During practical application, when the SDN controller and the OFS in the network successfully establish a connection, the SDN controller can send a request message to each OFS in the network, and in such a manner, the SDN controller may obtain capability information of each OFS in the network, and may also obtain node information of each OFS.

Before performing network path calculation, the SDN controller is required to be triggered by some triggering conditions. For example, after the SDN controller receives a first packet or the SDN controller has configured a forwarding path on the basis of a certain strategy, the SDN controller may analyze addressing information contained in the message and then calculate a forwarding path from a source switch to a destination switch in combination with the obtained capability information of each OFS and part or all of existing constraint conditions, and the controller may further determines a message forwarding behavior according to the information of the first packet and a configured strategy, to configure a forwarding path for each OFS on the forwarding path.

It is important to note that besides a capability of the switch and part of the existing constraint conditions (the link cost), other existing constraint conditions (such as the link bandwidth, the link attribute, the management weight and the network resource information) may further be combined as constraint conditions for calculating a path in a path calculation process.

By adopting the method and device for calculating the network path provided by the embodiment, the network path may be calculated by extending an existing SPF/CSPF path calculation method and adopting the capability information of the OPS and the existing constraint condition as the constraint condition for calculating a path, so that correctness of calculating a SDN path is further improved.

The method and device for calculating a network path provided by the embodiment will be described and explained below with FIG. 4, FIG. 5, example embodiment 1 and example embodiment 2 in more detail.

Example Embodiment 1

Figure 4:
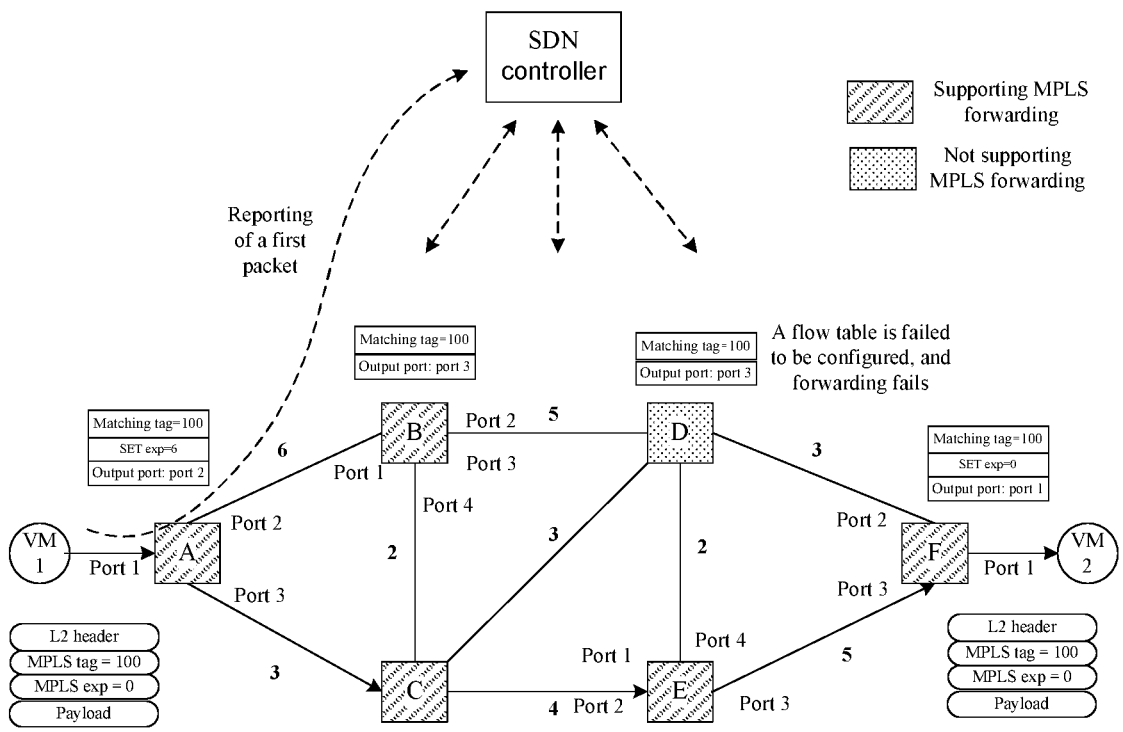
FIG. 4 is a diagram of switch-capability-based path calculation result and flow table configuration according to an example embodiment of the present disclosure.

FIG. 4 is a diagram of switch-capability-based path calculation result and flow table configuration according to an example embodiment of the present disclosure, and as shown in FIG. 4, the path calculation and forwarding flow includes the following steps.

Step 1: after an SDN controller successfully establishes a TCP connection and shakes hands with each OFS in a network, the controller sends a request message to obtain node information and capabilities of each OFS in the network, wherein the controller learns about that all of the switches except switch D support MPLS forwarding.

Step 2: after receiving a message, switch A reports the message to the controller for processing as a first packet due to the fact that no flow table may be found.

Step 3: the controller analyzes address information of the message after receiving the first packet, and runs an improved switch-capability-based path algorithm to calculate a minimum-cost forwarding path from A to destination switch F, wherein the calculated path is A-C-E-F.

Specifically, (1) the SDN controller adds node information of a source switch into a PATH list (in which nodes are called path nodes) after running an SFP path selection algorithm adopting a capability of a switch as a constraint condition, sets cost to be 0 and sets a capability of the source switch to be N/A; (2) the path node which is put right now is extracted from the PATH list, all neighboring nodes of the path node are added into a TENT list, when a certain neighboring node has existed in the PATH list or the TENT list and has lower path cost, the neighboring node is not added into the TENT list, and when a capability of a certain neighboring node does not support a forwarding behavior required by the controller, the neighboring node is not added into the TENT list; (3) the neighboring node with minimum cost is found from the TENT list, and the found node is added into the PATH list; and Step (2) is repeated, and when the destination switch has existed in the PATH list, calculation is stopped. After the forwarding path of the message is calculated, the controller transmits a flow table to each switch on the forwarding path, and configures the forwarding path from the source switch to the destination switch; and the message enters the OFS, and is forwarded according to the configured flow table.

In order to facilitate understanding, the following table is referred to.

TABLE 1

Switch-Capability-Based Path Calculation Result and Flow Table Configuration Step Table

| Step | PATH list | TENT list |
|---|---|---|
| 1 | A is selected, PATH list = <A>; at this moment, the shortest path is: A->A = 0; neighboring nodes are searched from A by taking A as an intermediate node; | TENT list = <B, C,> A->B = 6; A->C = 3; it is discovered that cost of A->C is minimum; |
| 2 | C is selected, PATH list = <A, C>; at this moment, the shortest path is: A->A = 0, and A->C = 3; neighboring nodes are searched from the shortest path A->C by taking C as an intermediate node; | TENT list = <B, E> A->C->B = 5; (smaller than A->B = 6 in Step 1, at this moment, the cost is modified into A->C->B = 5); A->C->E = 7; it is discovered that cost of A->C->B = 5 is minimum; switch D is not selected into the TENT list because the switch D does not support MPLS forwarding; |
| 3 | B is selected, PATH list = <A, C, B>; at this moment, the shortest path is: A->A = 0, A->C = 3, and A->C->B = 5; neighboring nodes are searched from the shortest path A->C->B = 5 by taking B as an intermediate node; | TENT list = <> switch D is not selected into the TENT list because the switch D does not support MPLS forwarding; it is discovered that cost of A->C->E = 7 in Step 2 is minimum; notes: the list is empty, and it is necessary to continue searching unless the destination node has existed in the PATH list; |
| 4 | E is selected, PATH list = <A, C, B, E>; at this moment, the shortest path is: A->A = 0, A->C = 3, A->C->B = 5, and A->C->E = 7; neighboring nodes are searched from the shortest path A->C->E by taking E as an intermediate node; | TENT list = <F> A->C->E->F = 12; ( ) it is discovered that cost of A->C->E->F = 12 is minimum; switch D is not selected into the TENT list because the switch D does not support MPLS forwarding; |
| 5 | F is selected, PATH list = <A, C, B, D, E, F>; at this moment, the shortest path is: A->A = 0, A->C = 3, A->C->B = 5, A->C->D = 6, A->C->E = 7, and A->C->E->F = 12; neighboring nodes are searched from the shortest path A->C->E->F by taking F as an intermediate node; | TENT list = <> F has existed in the PATH list, and searching is ended; |

Step 4: the controller transmits the flow table to switches A, C, E and F, and configures forwarding channels.

Step 5: A, C, E and F all support MPLS forwarding, and the flow table is successfully configured.

Step 6: the message enters switch A, and is forwarded according to the flow table configured by the controller, and passing through C and E and reaching F, the message is successfully forwarded.

Example Embodiment 2

Figure 5:
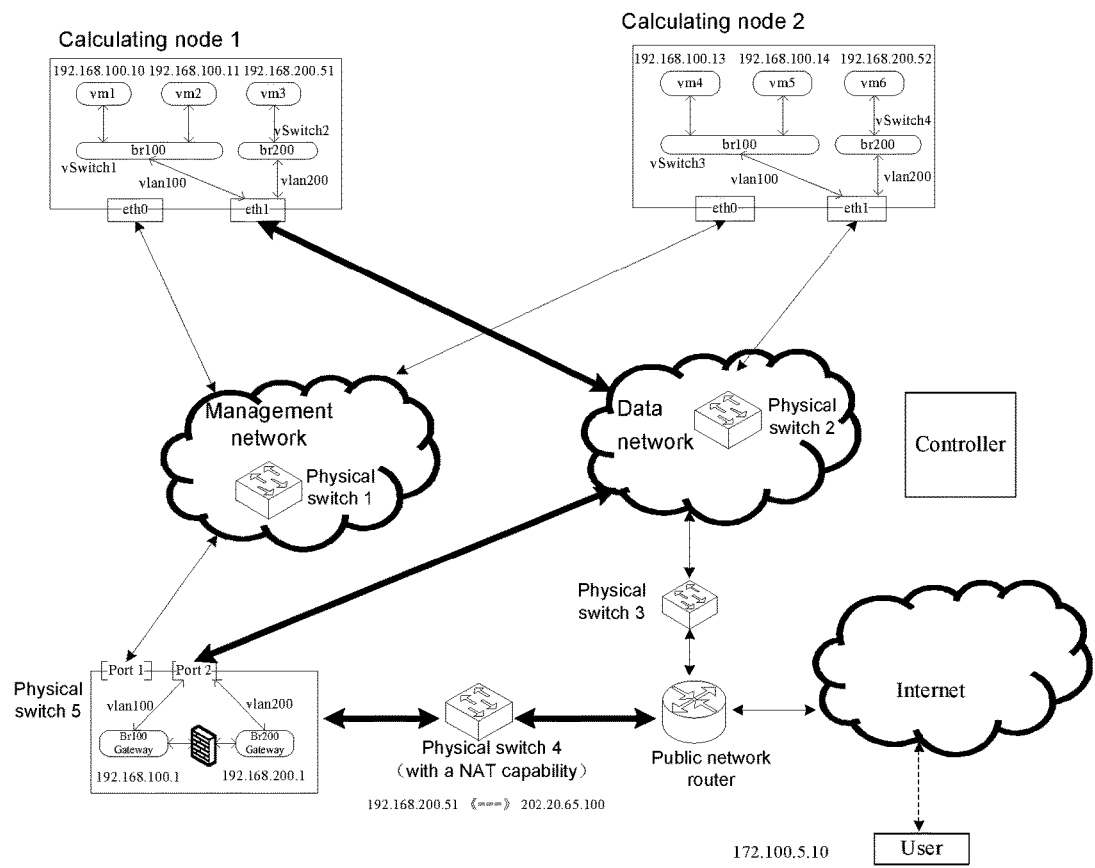
FIG. 5 is a flowchart of a switch with an NAT capability and path calculation according to an example embodiment of the present disclosure.

FIG. 5 is a flowchart of a switch with a NAT capability and path calculation according to an example embodiment of the present disclosure. As shown in FIG. 5, there are two switches connected to a public network router, one having a NAT capability and the other not having the NAT capability. The path calculation flow includes the following steps:

Step 1: after an SDN controller successfully establishes a TCP connection and shakes hands with each OFS in a network, the controller sends a request message to obtain node information and capabilities of each OFS in the network, wherein the controller learns about that all of the switches except physical switch 3 support NAT, that is, the switches with the NAT capability can modify a destination IP address and source IP address in the message according to set-field action of a flow table;

Step 2: when a user accesses vm3 through the web, vm3 sends a Hyper Text Transport Protocol (HTTP) request message, destination ip=172.100.5.10 and source ip=192.168.200.51, wherein the message as a first packet is reported to the SDN controller for processing;

Step 3: the controller runs a switch-capability-based path algorithm according to dip information and sip information of the first packet, and selects switch 4 rather than switch 3 as a switch for accessing a public network, wherein a calculated path is shown by red line in FIG. 3;

Step 4: the controller transmits the flow table to vSwitch and physical switch on the forwarding path, and on switch 4, the flow table is transmitted to implement Source NAT (SNAT) operation, i.e. sip of the http request message is modified, sip=192.168.200.51 being modified into 202.20.65.100;

Step 5: when the user receives the http request message, the user returns an http reply with dip=202.20.65.100 and sip=172.100.5.10;

Step 6: the message reaches a controller of a data center, and the controller runs the switch-capability-based path algorithm, and selects switch 4 rather than switch 3 as a switch accessing the public network, wherein the calculated path is shown by bold line in FIG. 5;

Step 7: the controller transmits the flow table to switch 4 to implement Destination NAT (DNAT) operation, i.e. dip in the http reply is modified, dip=202.20.65.100 being modified into 192.168.200.51; and Step 8: the modified http reply is forwarded to VM3 for processing through an intermediate switch.

Of course, the abovementioned two embodiments are merely two example implementation modes, and the embodiment may also adopt multiple other implementation modes. For example, path calculation is performed on the basis of other capabilities, including a supported maximum buffer, a maximum number of a flow table, a statistical capability, a capability of IP fragmentation and reassembly, a capability of avoiding a loop, a maximum number of entries of a flow table, a supported and matched message field, supported metadata, supported instructions and actions, a supported number of entries of a group, the number of a meter table, a bandwidth type, a color value and the like.

It is important to note that each module may be implemented by hardware. For example, a processor includes each of the abovementioned modules, or, each module is located in a processor respectively.

In another embodiment, software is further provided, which is configured to execute the technical solution described in the abovementioned embodiment and example implementation mode.

In another embodiment, a storage medium is further provided, in which the abovementioned software is stored, the storage medium including, but not limited to: a compact disc, a floppy disk, a hard disk, an erasable memory and the like.

From the above description, it can be seen that the present disclosure achieves technical effects as follows: the network control node calculates an optimal network path from the source node and the destination node by adopting the capability information of the forwarding node as the constraint condition for calculating a network path on the basis of the existing constraint condition, and in such an improved manner, the problem that the controller may not calculate a new path due to the fact of flow table configuration failure caused by different capabilities of each switch in the related art is solved, and the effect of improving SDN path calculation correctness and network applicability is further achieved.

Obviously, those skilled in the art should know that each module or step of the present disclosure may be implemented by a universal computing device, and the modules or steps may be concentrated on a single computing device or distributed on a network formed by a plurality of computing devices, and may optionally be implemented by programmable codes executable for the computing devices, so that the modules or steps may be stored in a storage device for execution with the computing devices, the shown or described steps may be executed in sequences different from those described here in some circumstances, or may form each integrated circuit module respectively, or multiple modules or steps therein may form a single integrated circuit module for implementation. As a consequence, the present disclosure is not limited to any specific hardware and software combination.

The above is only the preferred embodiment of the present disclosure and not intended to limit the present disclosure, and for those skilled in the art, the present disclosure may have various modifications and variations. Any modifications, equivalent replacements, improvements and the like within the spirit and principle of the present disclosure shall fall within the scope of protection of the present disclosure.

INDUSTRIAL APPLICABILITY

From the above, by the embodiment and example implementation mode of the present disclosure, the network path is calculated by extending the existing SPF/CSPF path calculation method and adopting the capability information of the OPS and the existing constraint condition as the constraint condition for calculating the path, so that correctness of calculating the SDN path and network applicability are effectively improved.

What is claimed is:

1. A method for calculating a network path, wherein the method is applicable to a Software Defined Network (SDN), and the method comprises:

calculating, by an SDN controller, a forwarding path from a source switch to a destination switch according to capability information of an OpenFlow Switch (OFS) and a constraint condition; wherein the constraint condition comprises; link cost:

wherein the calculating, by the SDN controller, the forwarding path from the source Switch to the destination Switch according to the capability information of the OFS and the constraint condition comprises:

adding node information of the source switch into a PATH list:

after adding the node information of the source switch into the PATH list, executing repeatedly, by the SDN controller, following steps, until the destination switch exists in the PATH list:

extracting a path node from the PATH list, adding all neighboring nodes of the path node into a TENT list, wherein when a —neighboring node has existed in the PATH list or the TENT list and has the lowest link cost and/or when a capability of the neighboring node does not support a forwarding behavior required by the SDN controller, the neighboring node is not added into the TENT list; determining a neighboring node with minimum link cost from the TENT and adding this neighboring node into the PATH list:

when the destination switch has existed in the PATH list, configuring the forwarding path from the source switch to the destination switch.

2. The method as claimed in claim 1, wherein the capability information comprises: capability information of the OFS, wherein the capability information of the OFS comprises at least one of:
a switch feature, a flow table feature, a group feature and a meter table feature.

3. The method as claimed in claim 2, wherein
the switch feature comprises at least one of: a supported maximum buffer, a supported number of a table, a statistical capability, a capability of Internet Protocol, IP fragmentation and reassembly and a capability of avoiding a loop;
the flow table feature comprises at least one of: a maximum number of entries of a flow table, a supported and matched domain and mask, metadata allowed to be matched, metadata allowed to be written, supported instructions, supported actions and a table-miss capability;
the group feature comprises at least one of: a supported number of entries of a group, actions supported by a group, a supported type of a group and a group capability; and
the meter table feature comprises at least one of: the number of a meter table, a supported bandwidth type and a supported $max_{color}$.

4. The method as claimed in claim 2, wherein the link cost comprises: the number of hops; or,
the constraint condition comprises: link cost and at least one of: a link bandwidth, a link attribute, a management weight and network resource information, wherein the link attribute comprises: a link priority.

5. The method as claimed in claim 2, wherein a Shortest Path First/Constrained Shortest Path First (SPF/CSPF) path selection algorithm is adopted when the SDN controller calculates the forwarding path.

6. The method as claimed in claim 3, wherein the link cost comprises: the number of hops; or,
the constraint condition comprises: link cost and at least one of: a link bandwidth, a link attribute, a management weight and network resource information, wherein the link attribute comprises: a link priority.

7. The method as claimed in claim 3, wherein a Shortest Path First/Constrained Shortest Path First (SPF/CSPF) path selection algorithm is adopted when the SDN controller calculates the forwarding path.

8. The method as claimed in claim 1, wherein the link cost comprises: the number of hops; or,
the constraint condition comprises: link cost and at least one of: a link bandwidth, a link attribute, a management weight and network resource information, wherein the link attribute comprises: a link priority.

9. The method as claimed in claim 1, wherein a Shortest Path First/Constrained Shortest Path First (SPF/CSPF) path selection algorithm is adopted when the SDN controller calculates the forwarding path.

10. A device for calculating a network path, wherein the device is applicable to a Software Defined Network (SDN), and the device is located at an SDN controller and comprises:
a calculating component, configured to calculate a forwarding path from a source switch to a destination switch according to capability information of an Open-Flow Switch (OFS) and a constraint condition; wherein the constraint condition comprises: link cost;
wherein the calculating component is further configured to:
add node information of the source switch into a PATH list;
after adding the node information of the source switch into the PATH list, execute following steps repeatedly, until the destination switch exists in the PATH list: extract a path node from the PATH list, add all neighboring nodes of the path node into a TENT list, wherein when a neighboring node has existed in the PATH list or the TENT list and has the lowest link cost and/or when a capability of the neighboring node does not support a forwarding behavior required by the SDN controller, the neighboring node is not added into the TENT list; determine a neighboring node with minimum link cost from the TENT list and add this neighboring node into the PATH list;
when the destination switch has existed in the PATH list, configure the forwarding path from the source switch to the destination switch.

11. The device as claimed in claim 10, wherein the capability information comprises: capability information of the OFS, wherein the capability information of the OFS comprises at least one of:
a switch feature, a flow table feature, a group feature and a meter table feature.

12. The device as claimed in claim 10, wherein the link cost comprises: the number of hops; or,
the constraint condition comprises: link cost and at least one of: a link bandwidth, a link attribute, a management weight and network resource information, wherein the link attribute comprises: a link priority.

13. The device as claimed in claim 10, wherein a Shortest Path First/Constrained Shortest Path First (SPF/CSPF) path selection algorithm is adopted when the calculating component calculates the forwarding path.

14. The device as claimed in claim 11, wherein
the switch feature comprises at least one of: a supported maximum buffer, a supported number of a table, a statistical capability, a capability of Internet Protocol, IP, fragmentation and reassembly and a capability of avoiding a loop;
the flow table feature comprises at least one of: a maximum number of entries of a flow table, a supported and matched domain and mask, metadata allowed to be matched, metadata allowed to be written, supported instructions, supported actions and a table-miss capability;
the group feature comprises at least one of: a supported number of entries of a group, actions supported by a group, a supported type of a group and a group capability; and
the meter table feature comprises at least one of: the number of a meter table, a supported bandwidth type and a supported $max_{color}$.

15. The device as claimed in claim 11, wherein the link cost comprises: the number of hops; or,
the constraint condition comprises: link cost and at least one of: a link bandwidth, a link attribute, a management weight and network resource information, wherein the link attribute comprises: a link priority.

16. The device as claimed in claim 14, wherein the link cost comprises: the number of hops; or,
the constraint condition comprises: link cost and at least one of: a link bandwidth, a link attribute, a management weight and network resource information, wherein the link attribute comprises: a link priority.

* * * * *